Dec. 3, 1968     S. WALLERSTEIN     3,414,338

GAS BEARING ADAPTER

Filed Oct. 22, 1965

INVENTOR.
STANLEY WALLERSTEIN

BY Darby & Darby

ATTORNEYS

United States Patent Office 3,414,338
Patented Dec. 3, 1968

3,414,338
GAS BEARING ADAPTER
Stanley Wallerstein, Smithtown, N.Y., assignor to Fairchild Hiller Corporation, Bay Shore, N.Y., a corporation of Maryland
Filed Oct. 22, 1965, Ser. No. 500,674
5 Claims. (Cl. 308—9)

ABSTRACT OF THE DISCLOSURE

A gas bearing and method of making the same, which bearing material of a predetermined shape is place on a bearing adapter.

---

This invention relates to gas bearings and method of manufacturing the same and more particularly to a gas bearing made with a central bearing adapter.

Gas bearings are known in the art for supporting the oppositely disposed surfaces of two relatively rotatable elements on a film of fluid, such as a gas. The fluid for the load supporting film can be either supplied from an external source under pressure, in which case the bearing is called a pneumostatic bearing, or developed internally by the rotation of the two elements, in which case the bearing is called a pneumodynamic bearing.

Gas bearings require considerably more time and expense to fabricate than conventional lubricated friction type bearings. First of all, they need extremely close dimensional and smoothness of finish tolerances. Also, some gas bearing materials are more difficult to work with and more expensive than the metals usually employed in friction bearings. Therefore, it is highly advantageous to provide a gas bearing and method of making the same which can decrease the cost of fabrication encountered when using prior art techniques.

The present invention is directed to a novel gas bearing and method of making the same which reduces the quantity of expensive and difficult to machine materials needed for the bearing. This is accomplished by limiting their use to those areas where such materials are specifically required, namely, the immediate bearing surfaces. By doing this the machining required is considerably reduced and bearings are more economically produced with fewer rejects.

In accordance with the invention a central bearing adapter is provided on which the bearing material is placed. Where a vitreous bearing material is used, for example glass, ceramic, cermets, etc., the material is coated onto the adapter, or a slug of the material is fastened thereon in any suitable manner, and the outer surface of the material is then machined to the required tolerance and finish. If desired, the bearing adapter can serve as a mounting for the bearing as it is machined. The finished bearing can then be mounted into the machine in which it is to be used using the bearing adapter, or a portion thereof, as the mounting member.

It is therefore an object of the present invention to provide a novel gas bearing and the method of manufacturing the same.

A further object is to provide a gas bearing having a central bearing adapter.

An additional object is to provide a method of manufacturing a gas bearing by forming the bearing material around a central bearing adapter.

Still another object is to provide a gas bearing having a central bearing adapter about which a blank of bearing material is formed, the material then being machined to produce the bearing surface.

Figure 1:
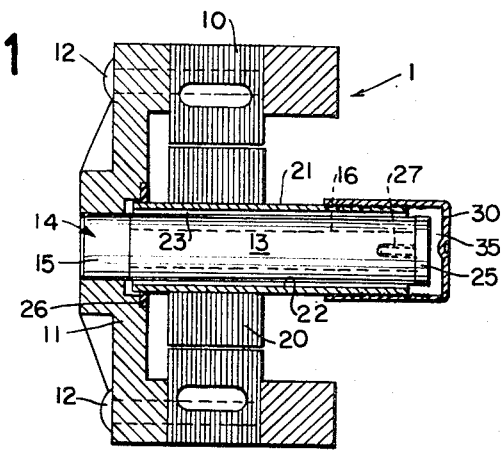
Figure 2:
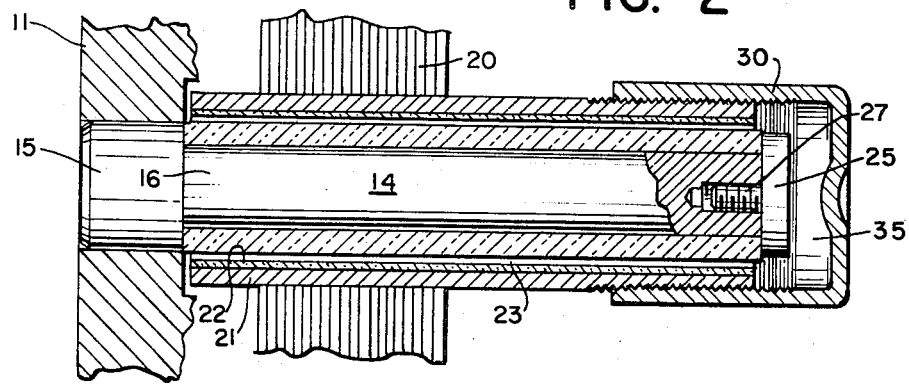
Figure 3:
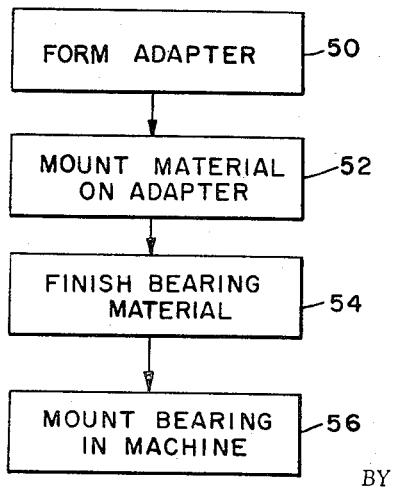

Other objects and advantages of the present invention will become more apparent upon reference to the following specification and annexed drawings in which:

FIGURE 1 is an elevational view, taken partially in section, of one form of motor with which the bearing of the present invention can be utilized. FIGURE 2 is an enlarged view of a portion of the motor of FIGURE 1 showing the bearing and adapter; and FIGURE 3 is a flow diagram illustrating the method of manufacturing the bearing.

Referring first to FIGURE 1, an electric motor 1 of the type shown in Patent 2,928,960 to Elmer Fred Macks has a stator element 10 for producing an electromagnetic field mounted on a generally U-shaped stator frame 11 by a plurality of bolts 12. A stationary stator bearing 13 is centrally mounted on frame 11 by the end 15 of a bearing adapter 14. Adaptor 14 is made of metal so that the end 15 is staked, soldered, brazed or welded to the frame. A shaft 16 of adapter 14 runs the length of bearing 13 and the bearing material is placed thereon.

The rotor element 20 for the motor is mounted on the outside of a sleeve 21 aligned with the stator 12. The inner surface 22 of sleeve 21 is also formed with a bearing material compatible with the material of bearing 13 and an open end of sleeve 21 is attached to the frame 11. An O-ring 26 seals this end of sleeve 21 from the ambient environment. The other end of the sleeve is sealed by a cap 30 forming a trapped pocket 35 of fluid between the end 25 of the stator bearing adapter 14 and the cap.

In operation of the motor of FIG. 1, power is applied to the stator 10 causing relative rotation between the rotor and stator elements. The clearance 23 between the outer surface of bearing 13 and the inner bearing surface 22 of sleeve 21 is selected so that a load supporting fluid film is dynamically produced which supports the rotor as it turns. The trapped pocket of fluid 35, which is supplied through the clearance area 23 between the opposing bearing surfaces, acts as an axial thrust bearing. The detailed operation of this motor is described in detail in the aforesaid Macks patent.

As should be clear from FIG. 1, bearing 13 only has bearing material over the active gas bearing surface area. This is shown in greater detail in FIG. 2. Here, the left end 15 of metallic adapter 14 is integrally formed with central shaft 16 on which is located the bearing material 13. The material for bearing 13 can be a suitable ceramic, cermet, glass, etc. Where a vitreous material is used it can be flame sprayed onto the shaft. Also, a tubular slug of bearing material can be formed and then cemented over the shaft.

As shown in FIG. 2, the right end 25 of adapter 14 is mounted onto the shaft 16 by a screw 27. This arrangement permits the end member 25 to be adjusted longitudinally to thereby adjust the action of the trapped fluid pocket 35. Also, where a tubular bearing slug is used, the slug can be placed on shaft 16 before member 25 is connected thereto. Of course, member 25 can be made integral with the shaft in which case the material 13 is preferably flame sprayed onto the shaft. Also, member 25 can be omitted so that either flame spraying or a slug can be used.

The adapter arrangement of FIG. 2 has several advantages. First, as pointed out above, bearing material 13 is needed only on the active bearing surface area. This decreases the requirement for bearing material. Also, the more sturdy metal end 15 of the adapter is used to mount the bearing to the motor. This provides a more rigid mounting than can be obtained if the vitreous bearing material is used to mount the bearing to the frame. If desired, the other end of the shaft also can be used to mount bearing 13. Further, during fabrication of the bearing the end 15 and shaft 16, or member 25, can be used as mounting members for holding bearing 13 during machining of its outer surface. All of these advantages make bearing fabrication easier and more economical, reduce the number of manufacturing rejects and increase the ease of mounting the bearing and its stability in the machine.

FIGURE 3 is a flow diagram of the preferred method of manufacturing the bearings of the present invention. In step 50 the adapter 14 is formed by any suitable process such as casting, machining, etc. Next, the bearing material is fastened to adapter in step 52. This is done in the case of vitreous materials by cementing a bearing blank to the adapter, flame spraying the material, or by any other suitable coating practice. In step 54 the bearing material on the adapter is finished to the proper tolerances and in step 56 the bearing is mounted in the machine by means of the adapter.

While a preferred embodiment of the invention has been described above, it will be understood that this is illustrative only, and the invention is limited solely by the appended claims.

What is claimed is:

1. A dynamo-electric machine of the pneumodynamic bearing type comprising a frame, rotor and stator means, means for mounting one of said rotor and stator means to said frame, a stationary elongated cylindrical bearing formed by an elongated adapter of rigid material to which is bonded a vitreous bearing material having a cylindrical outer surface with a portion of said adapter left uncovered of said bearing material, means for fixedly mounting the bearing to said frame at the uncovered end of the adapter to maintain axial alignment of the bearing, and means carried by the other of said rotor and stator elements fitting over the cylindrical outer surface of said bearing for developing a load carrying film therebetween when the machine is in operation.

2. A gas bearing as in claim 1 wherein the uncovered portion of the adapter is at an end thereof.

3. A gas bearing adapter as in claim 2 wherein the bearing material is coated on the corresponding portion of the adapter.

4. A gas bearing as in claim 2 wherein the adapter has a central shaft on which the bearing material is mounted and the portion of the shaft which is uncovered by bearing material is of larger diameter than the remainder of the shaft.

5. A gas bearing as in claim 2 wherein the bearing material is in the form of a blank bonded to the corresponding portion of the adapter.

References Cited

UNITED STATES PATENTS

| 3,121,179 | 2/1964 | Macks | 308 |
| 3,284,144 | 11/1966 | Moore et al. | 308 |
| 2,928,960 | 3/1960 | Macks | 308—9 |

FOREIGN PATENTS 379,204  8/1964  Switzerland.

MARTIN P. SCHWADRON, *Primary Examiner.*

FRANK SUSKO, *Assistant Examiner.*